(12) United States Patent
Anderson et al.

(10) Patent No.: US 10,707,669 B2
(45) Date of Patent: Jul. 7, 2020

(54) GROUNDED NEUTRAL DETECTION CIRCUIT AND CIRCUIT INTERRUPTER INCLUDING THE SAME

(71) Applicant: EATON CORPORATION, Cleveland, OH (US)

(72) Inventors: Adonna Angelika Anderson, Pittsburgh, PA (US); Jian Jiao, Sewickley, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 432 days.

(21) Appl. No.: 15/607,999

(22) Filed: May 30, 2017

(65) Prior Publication Data

US 2018/0351342 A1 Dec. 6, 2018

(51) Int. Cl.
| | | |
|---|---|---|
| *H01H 9/54* | (2006.01) | |
| *H02H 1/00* | (2006.01) | |
| *H02H 3/16* | (2006.01) | |
| *H02H 3/33* | (2006.01) | |
| *H01H 83/14* | (2006.01) | |
| *H01H 83/04* | (2006.01) | |

(52) U.S. Cl.
CPC ............ *H02H 1/0007* (2013.01); *H01H 9/54* (2013.01); *H01H 83/144* (2013.01); *H02H 3/16* (2013.01); *H02H 3/331* (2013.01); *H01H 83/04* (2013.01)

(58) Field of Classification Search
CPC ........ H02H 1/0007; H02H 3/16; H02H 3/331; H01H 9/54; H01H 83/144
See application file for complete search history.

(56) References Cited

U.S. PATENT DOCUMENTS

| | | | | |
|---|---|---|---|---|
| 8,929,037 B2 | 1/2015 | Miller | | |
| 2007/0285266 A1* | 12/2007 | Angle | ................ | G01R 31/3277 340/638 |
| 2013/0279050 A1* | 10/2013 | Kinsel | .................... | H02H 3/331 361/49 |
| 2014/0171935 A1* | 6/2014 | Digmann | ........... | A61B 18/1206 606/34 |

* cited by examiner

*Primary Examiner* — Scott Bauer
(74) *Attorney, Agent, or Firm* — Eckert Seamans Cherin & Mellott, LLC

(57) ABSTRACT

A circuit interrupter including a line conductor, a neutral conductor, a power supply, a ground fault current transformer structured to sense a ground fault current from current flowing through the line and neutral conductors, a grounded neutral detection circuit including a filtering stage structured to high-pass filter the ground fault current, and a processor structured to receive an output of the grounded neutral detection circuit and to determine whether a grounded neutral is present based on the output of the grounded neutral detection circuit.

17 Claims, 4 Drawing Sheets

GROUNDED NEUTRAL DETECTION CIRCUIT AND CIRCUIT INTERRUPTER INCLUDING THE SAME

BACKGROUND

Field

The disclosed concept relates generally to circuit interrupters, and in particular, to circuit interrupters providing grounded neutral protection. The disclosed concept also pertains to methods of detecting grounded neutrals.

Background Information

One type of electrical switching apparatus is a circuit interrupter. Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of a handle disposed on the outside of a case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

One type of fault condition is a grounded neutral condition. UL943 specifies that a circuit interrupter should trip when the impedance between neutral and ground downstream of the circuit interrupter is 2Ω or less. UL943 also specifies that the circuit interrupter must be capable of causing this trip without the application of a load current. However, without the application of a load current, the ground fault current is relatively small, thus making it difficult to detect a grounded neutral condition.

There is room for improvement in circuit interrupters. There is also room for improvement in methods of detecting grounded neutrals.

SUMMARY

These needs and others are met by embodiments of the disclosed concept in which a circuit interrupter structured to detect a grounded neutral condition from a ground fault current.

In accordance with aspects of the disclosed concept, a circuit interrupter comprises: a line conductor; a neutral conductor; a power supply; a ground fault current transformer structured to sense a ground fault current from current flowing through the line and neutral conductors; a grounded neutral detection circuit including a filtering stage structured to high-pass filter the ground fault current; and a processor structured to receive an output of the grounded neutral detection circuit and to determine whether a grounded neutral is present based on the output of the grounded neutral detection circuit.

In accordance with other aspects of the disclosed concept, a method of detecting a grounded neutral condition with a circuit interrupter comprises: sensing a ground fault current from current flowing through line and neutral conductors; applying a high-pass filter to the ground fault current; and determining if a grounded neutral is present based on the filtered ground fault current.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
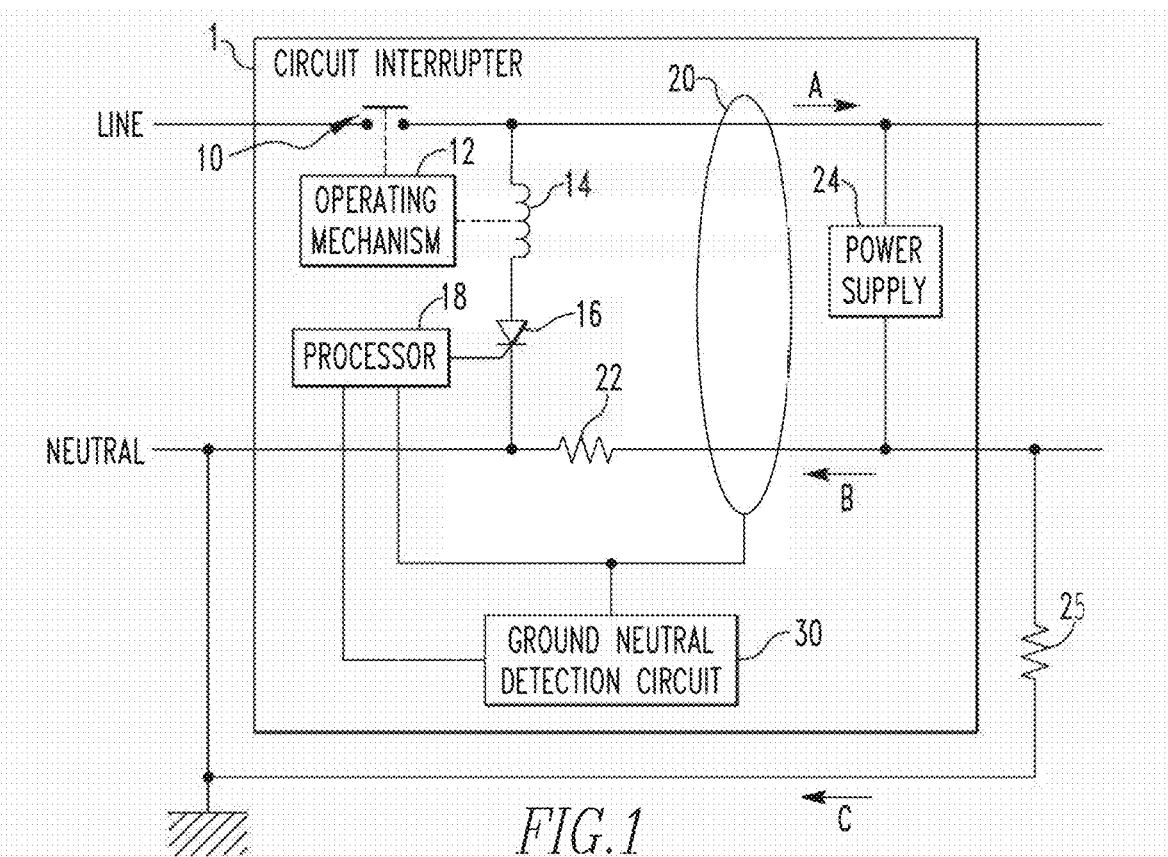
FIG. 1 is a schematic diagram of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "electrical conductor" shall mean a wire (e.g., without limitation, solid; stranded; insulated; non-insulated), a copper conductor, an aluminum conductor, a suitable metal conductor, or other suitable material or object that permits an electric current to flow easily.

FIG. 1 is a circuit diagram of a circuit interrupter 1 in accordance with an example embodiment of the disclosed concept. The circuit interrupter 1 is structured to be electrically connected between a power source (not shown) and a load (not shown) via LINE and NEUTRAL conductors. The circuit interrupter 1 includes separable contacts 10 and an operating mechanism 12 which is configured to open and close the separable contacts 10. Opening the separable contacts 10 (e.g., tripping open the separable contacts 10) opens the circuit between the power source and the load. The circuit interrupter 1 further includes a trip circuit which is electrically connected between the LINE and NEUTRAL conductors. The trip circuit is structured to cause the operating mechanism 12 to open the separable contacts 10. The trip circuit includes a trip coil 14 and a silicon controlled rectifier (SCR) 16 that are electrically connected in series between the LINE and NEUTRAL conductors. The trip coil 14 is included in a solenoid (not shown) that is configured to cooperate with the operating mechanism 12 to cause the operating mechanism 12 to open the separable contacts 10. For example and without limitation, turning on the SCR 16 causes current to flow through the trip coil 14, which in turn causes the solenoid to interact with the operating mechanism 12 and cause the operating mechanism 12 to open the separable contacts 10. While an example of one type of trip circuit has been described herein, it will be appreciated that other suitable types of trip circuits may be employed without departing from the scope of the disclosed concept.

The circuit interrupter 1 also includes a processor 18. The processor 18 is structured to receive inputs from one or more sensors (e.g., without limitation, current sensors, voltage sensors, temperature sensors, etc.) and to detect fault conditions in the power flowing through the circuit interrupter. The processor 18 is also electrically connected to the SCR 16 and is structured to control the SCR 16 to turn on and turn off. For example and without limitation, the processor 18 may output a trip signal to turn on the SCR 16 in response to detecting a fault condition in order to initiate tripping open of the separable contacts 10.

The circuit interrupter 1 further includes a ground fault current transformer (ground fault CT) 20. The ground fault CT 20 is structured sense a ground fault current between the LINE and NEUTRAL conductors in the circuit interrupter 1. The output of the ground fault CT 20 is provided to the processor 18 and to a grounded neutral detection circuit 30. The output of the grounded neutral detection circuit 30 is also provided to the processor 18.

A shunt resistor 22 is provided on the NEUTRAL conductor in the circuit interrupter 1. In some example embodiments of the disclosed concept, the shunt resistor 22 has a resistance of about 2 mΩ. However, it will be appreciated by those having ordinary skill in the art that other resistances may be used in the shunt resistor 22 without departing from the scope of the disclosed concept.

A power supply 24 is electrically connected between the LINE and NEUTRAL conductors. The power supply 24 is structured to convert AC power from the power source to DC power usable by components of the circuit interrupter 1. For example and without limitation, the processor 18 may be powered by DC power from the power supply 24.

Current flowing through the LINE conductor is depicted as current path A in FIG. 1 and current flowing through the NEUTRAL conductor is depicted as current path B in FIG. 1. The ground fault CT 20 senses a ground fault current between the currents flowing through current path A and current path B. The ground fault current is a difference between the magnitude of the current flowing through the LINE conductor and a magnitude of the current flowing through the NEUTRAL conductor. Under normal conditions, the magnitudes of current flowing through the LINE and NEUTRAL conductors should be equal. A ground fault is an inadvertent contact between an energized conductor and ground and will cause a difference in magnitudes between the currents in the LINE and NEUTRAL. The ground fault current is the difference in magnitudes between the current flowing through the LINE and NEUTRAL conductors and it can be sensed by the ground fault CT 20.

UL943 requires that a grounded neutral shall be detected with or without a small ground fault. UL943 also requires that a small ground fault (<4 mA) shall not cause a ground fault trip when there is no grounded neutral fault. A ground fault and a grounded neutral will both cause a difference in magnitudes of current flowing in the LINE and NEUTRAL conductors. The circuit interrupter 1 in accordance with example embodiments of the disclosed concept is able to differentiate between a ground fault and a grounded neutral. In accordance with some example embodiments of the disclosed concept, the circuit interrupter 1 is able to differentiate between a ground fault and a grounded neutral when the load current is less than 1 A.

The ground fault current output from the ground fault CT 20 due to a ground fault will have about the same frequency as the power flowing through the circuit interrupter 1. In many cases, utility power has a frequency of 60 Hz.

When there is a grounded neutral, some current that would normally flow through current path B (i.e., through the NEUTRAL conductor) will instead flow through current path C shown in FIG. 1. Current path C is a representative path that represents the current that flows from neutral to ground in a grounded neutral condition. A representative resistor 25 is included on the representative current path C. The representative resistor 25 represents the resistance between the neutral and ground downstream of the circuit interrupter 1. The representative current path C is only illustrated for purposes of conceptually understanding a grounded neutral condition. However, for the purposes of testing the ability of the circuit interrupter 1 to detect a grounded neutral condition, a conductor may be electrically connected in a similar manner to representative current path C and a resistor may be connected between neutral and the conductor in a similar manner as the representative resistor 25. A resistance of 2Ω or less may be used to test the ability of the circuit interrupter 1 to detect a resistance of 2Ω or less between ground and neutral.

Operation of the power supply 24 periodically causes certain characteristics to be present in the current flowing through the LINE and NEUTRAL conductors. In particular, the power supply 24 periodically causes a drop in the current flowing through the LINE and NEUTRAL conductors. The periodic drop in current is due to the operations of the power supply 24 such as converting AC power to DC power. During normal operation, the drop in current would not be sensed by the ground fault CT 20 because the current would drop equally in the LINE and NEUTRAL conductors. However, when there is a grounded neutral, some of the characteristic drop in current due to the power supply 24 will travel through representative current path C rather than through current path B (i.e., the NEUTRAL conductor). As a result, the ground fault CT 20 will be able to sense the periodic drop in current due to the power supply 24 when there is a grounded neutral condition.

While the drop in current due to a grounded neutral condition will be reflected in the ground fault current sensed by the ground fault CT 20, the drop in current can be overshadowed by a ground fault. To separate the drop in current sensed by the ground fault CT 20 from current sensed due to a ground fault, the circuit interrupter 1 includes a grounded neutral detection circuit 30. As previously mentioned, the current sensed by the ground fault CT 20 due to a ground fault is a signal having a similar frequency as the power flowing through the circuit interrupter 1, which is usually about 60 Hz. The drop in current due to the power supply 24, on the other hand, is a high frequency impulse. The grounded neutral detection circuit 30 is structured to high-pass filter and amplify the output of the ground fault CT 20. High-pass filtering the ground fault current removes the 60 Hz signal due to a ground fault and leaves the high frequency impulse due to the drop in current from the power supply 24. Amplifying the filtered ground fault current makes it easier for the processor 18 to detect whether the characteristic drop in current from the power supply 24 is present in the ground fault current. A presence of the characteristic drop in current is an indication of a grounded neutral condition.

Figure 2:
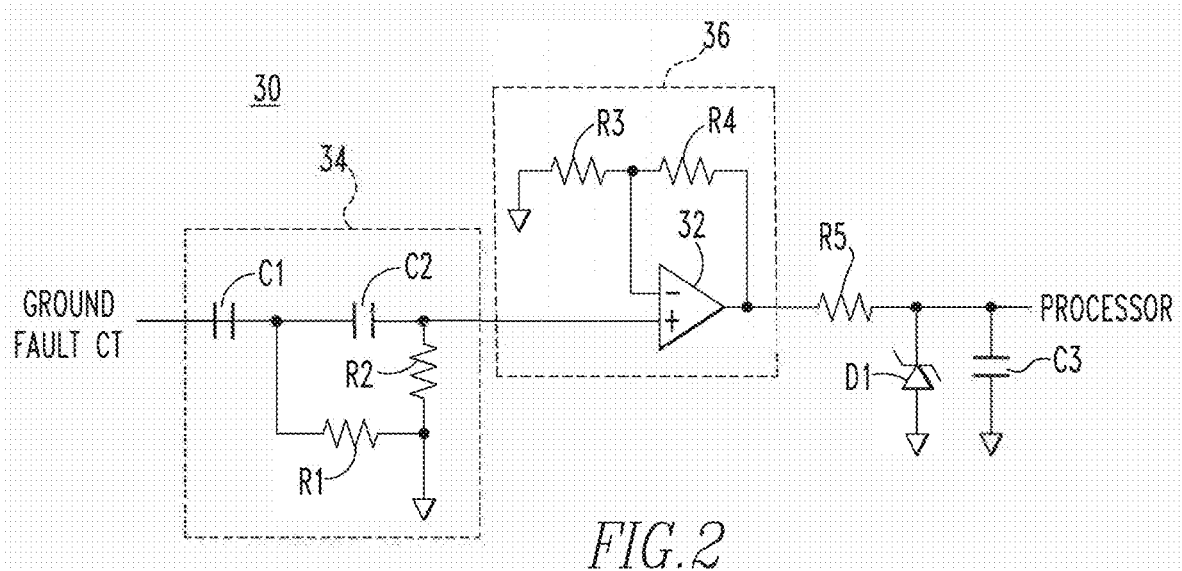
FIG. 2 is a circuit diagram of a grounded neutral detection circuit in accordance with an example embodiment of the disclosed concept.

Referring to FIG. 2, a circuit diagram of the grounded neutral detection circuit 30 in accordance with an example embodiment of the disclosed concept is shown. In accordance with some example embodiments of the disclosed concept, the grounded neutral detection circuit 30 includes a filtering stage 34 and an amplification stage 36. The filtering stage 34 is a high-pass filter structured to filter out 60 Hz AC components of the ground fault current output of the ground fault CT 20. The amplification stage 36 is connected to the output of the filtering stage and is structured to amplify the output of the filtering stage 34. The result is an amplification of the high frequency components (such as the high frequency impulse due to a drop in current) received by the grounded neutral detection circuit 30.

In some example embodiments of the disclosed concept, the filtering stage 34 includes capacitors C1,C2 and resistors R1,R2. Capacitor C1 is electrically connected to an input of the grounded neutral detection circuit 30. Capacitor C2 is electrically connected between capacitor C1 and an output of the filtering stage 34. Resistor R1 is electrically connected at one end to a point between capacitors C1 and C2 and at its other end to neutral. Resistor R2 is electrically connected between an output of the filtering stage 34 and neutral. In some example embodiments of the disclosed concept, capacitors C1,C2 each have a capacitance of about 0.033 µF and resistors R1,R2 each have a resistance of about 2 kΩ. However, it will be appreciated that the circuit components in the filtering stage 34, their arrangement, and their values may be modified without departing from the scope of the disclosed concept.

In some example embodiments of the disclosed concept, the amplification stage 36 includes resistors R3,R4 and an operational amplifier 32. In some example embodiments of the disclosed concept, the circuit components of the amplification stage 36 may be arranged as an inverting amplifier. For example and without limitation, the input of the amplification stage is electrically connected to a non-inverting input of the operational amplifier 32. Resistor R3 is electrically connected between the inverting input of the operational amplifier 32 and neutral and resistor R4 is electrically connected between the inverting input and the output of the operational amplifier 32. In some example embodiments of the disclosed concept, resistor R3 has a resistance of about 2 kΩ and resistor R4 has a resistance of about 66.5 kΩ, providing a gain in the amplification stage 36 of about 33.25. However, it will be appreciated that the circuit components in the amplification stage 36, their arrangement, and their values may be modified without departing from the scope of the disclosed concept. For example and without limitation, in some example embodiments of the disclosed concept, the amplification stage 36 has a gain of at least 30.

The grounded neutral detection circuit 30 may also include resistor R5 electrically connected between the output of the amplification stage and the output of the grounded neutral detection circuit 30. The grounded neutral detection circuit may also include zener diode Z1 and/or capacitor C3 electrically connected between the output of the grounded neutral detection circuit 30 and neutral. In some example embodiments of the disclosed concept, resistor R5 may have a resistance of about 500Ω and capacitor C3 may have a capacitance of about 10 nF. However, it will be appreciated that the circuit components in the grounded neutral detection circuit 30 may have different values without departing from the scope of the disclosed concept. The neutral shown in FIG. 2 is not the equivalent of the NEUTRAL conductor shown in FIG. 1. The neutral shown in FIG. 2 may be provided, for example, by the power supply 24 as a common reference for components of the circuit interrupter 1 such as the grounded neutral detection circuit 30 and the processor 18.

The output of the grounded neutral detection circuit 30 is provided to the processor 18. With the 60 Hz components of the ground fault current filtered out and the resultant signal amplified, the output of the grounded neutral detection circuit 30 can indicate whether or not there is a grounded neutral condition. For example, spikes in the signal output from the grounded neutral detection circuit 30 are indicative of a grounded neutral condition. The spikes may be detected by the processor 18 which, in turn, may initiate tripping open of the separable contacts 10 in response to detecting the grounded neutral condition.

Referring back to FIG. 1, the processor 18 receives the output of the ground fault CT 20 directly as well as the output of the grounded neutral detection circuit 30. The ground fault current output of the ground fault CT 20 may be used by the processor 18 to detect whether a ground fault is present. The processor 18 may also detect the magnitude of the ground fault current. Under UL943, the processor 18 should not initiate a trip due to a low level ground fault. The output of the grounded neutral detection circuit may be used by the processor 18 to detect whether a ground neutral is present. The processor 18 is thus able to distinguish between ground faults, low level ground faults, and grounded neutrals.

Figure 3:
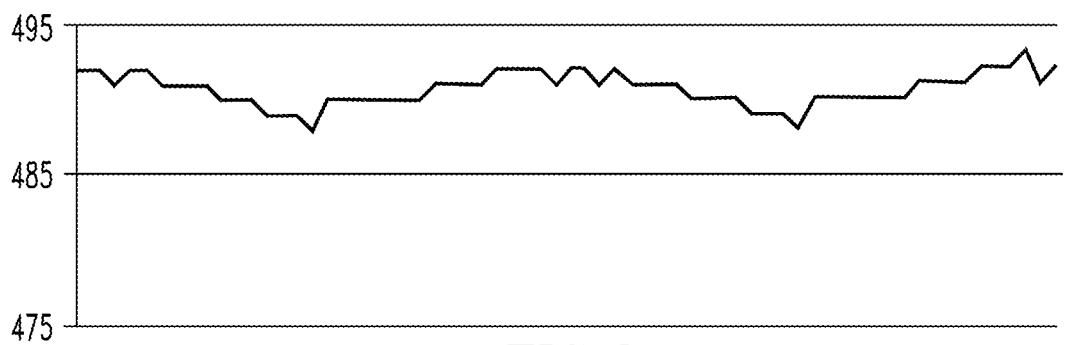
FIGS. 3-10 are charts showing outputs of a ground fault current transformer and a grounded neutral detection circuit under various ground fault and grounded neutral conditions in accordance with some example embodiments of the disclosed concept.
Figure 4:
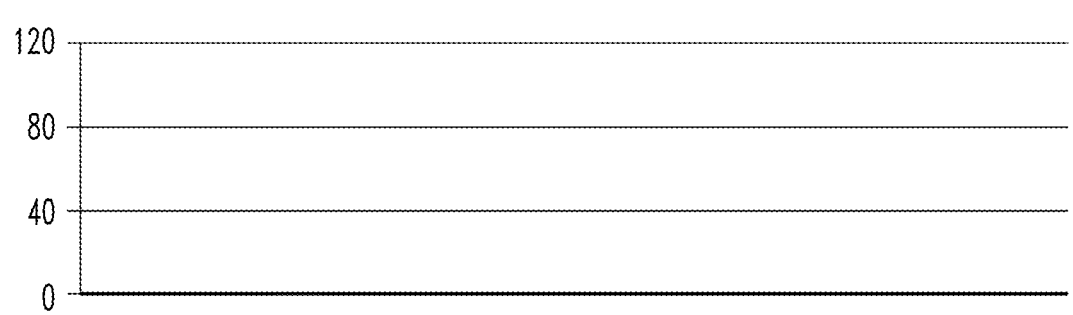

FIGS. 3-10 are charts illustrating are charts illustrating the outputs of the ground fault CT 20 and the grounded neutral detection circuit 30 under various combinations of ground fault and grounded neutral conditions. FIG. 3 illustrates an output of the ground fault CT 20 when no ground fault and no grounded neutral are present and FIG. 4 illustrates that output of the grounded neutral detection circuit 30 under the same condition. As shown in FIG. 3, no 60 Hz AC component is present, indicating there is no ground fault and, as shown in FIG. 4, there is no high frequency component left after the signal passes through the grounded neutral detection circuit 30, indicating that no grounded neutral is present.

Figure 5:
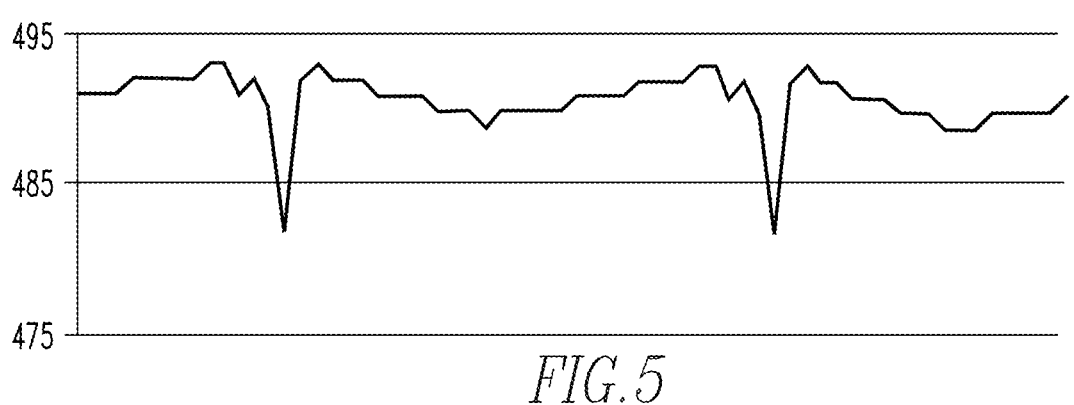
Figure 6:
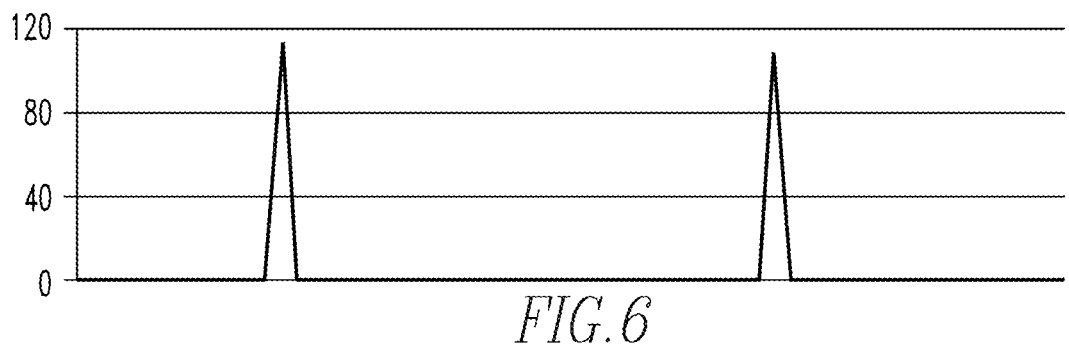

FIG. 5 illustrates an output of the ground fault CT 20 when no ground fault is present, but a grounded neutral is present. FIG. 6 illustrates an output of the grounded neutral detection circuit 30 under the same conditions. As shown in FIG. 5, no 60 Hz AC component is present, indicating there is no ground fault. The high frequency impulse drop in current due to the power supply 24 is visible in FIG. 5. As shown in FIG. 6, after passing through the grounded neutral detection circuit 30, spikes due to the high frequency impulse drop in current are present in the output of the grounded neutral detection circuit 30. The spikes indicate that a grounded neutral is present and are easy to detect by the processor 18.

Figure 7:
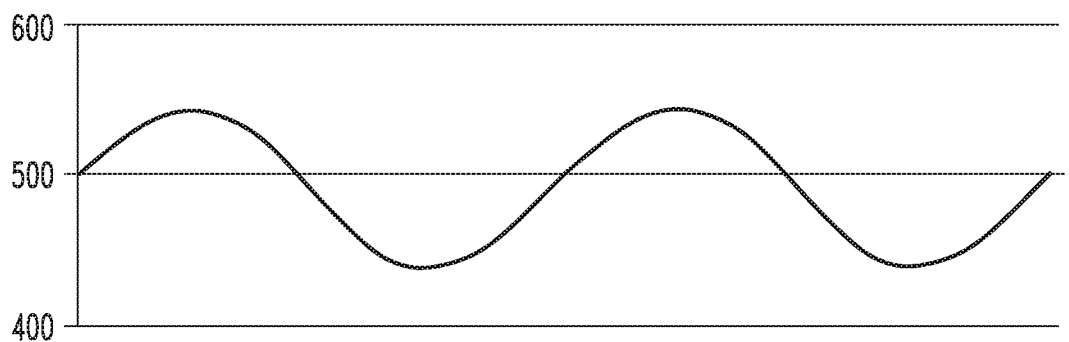
Figure 8:

FIG. 7 illustrates an output of the ground fault CT 20 when a ground fault is present, but a grounded neutral is not present. FIG. 8 illustrates an output of the grounded neutral detection circuit 30 under the same conditions. As shown in FIG. 7, a 60 Hz AC component is present, which indicates that there is a ground fault. The processor 18 may detect the magnitude of the ground fault and determine whether it is a ground fault that should result in a trip or whether it is a low level ground fault. As shown in FIG. 8, after passing through the grounded neutral detection circuit 30 and having the 60

Hz components removed, there are no spikes remaining in the resultant signal, indicating that no ground fault is present.

Figure 9:
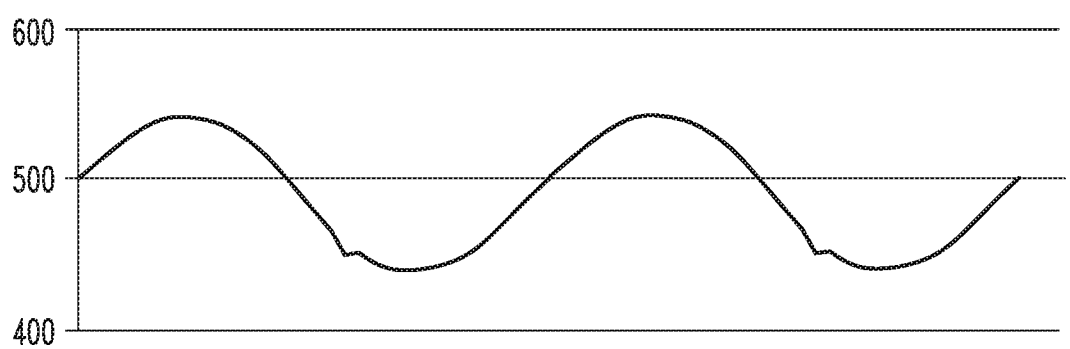
Figure 10:
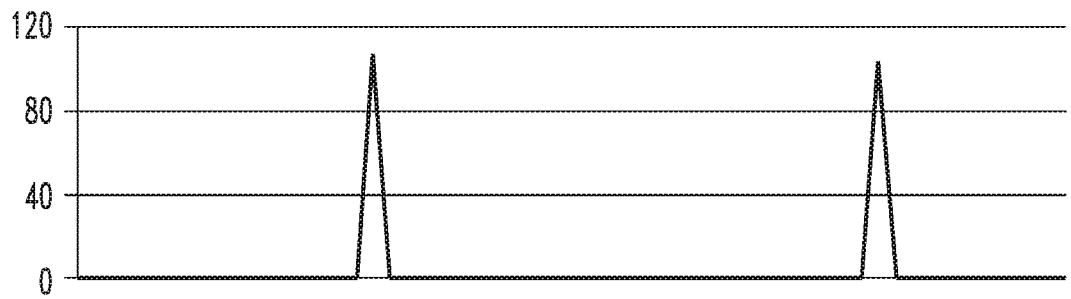

FIG. 9 illustrates an output of the ground fault CT 20 when both a ground fault and a grounded neutral are present. FIG. 10 illustrates an output of the grounded neutral detection circuit 30 under the same conditions. As shown in FIG. 9, a 60 Hz AC component is present, indicating there is a ground fault. A periodic small drop in the 60 Hz signal is visible in FIG. 9, but it is difficult to discern. The periodic small drop is the high frequency impulse drop in current due to the power supply 24, but it is difficult to detect due to the ground fault. As shown in FIG. 10, after passing through the grounded neutral detection circuit 30, the 60 Hz AC components due to the ground fault are removed. The remaining high frequency impulse drop in current remains and is amplified by the grounded neutral detection circuit 30. Spikes due to the high frequency impulse drop in current are present in the output of the grounded neutral detection circuit 30. The spikes indicate that a grounded neutral is present and are easy to detect by the processor 18.

Figure 11:
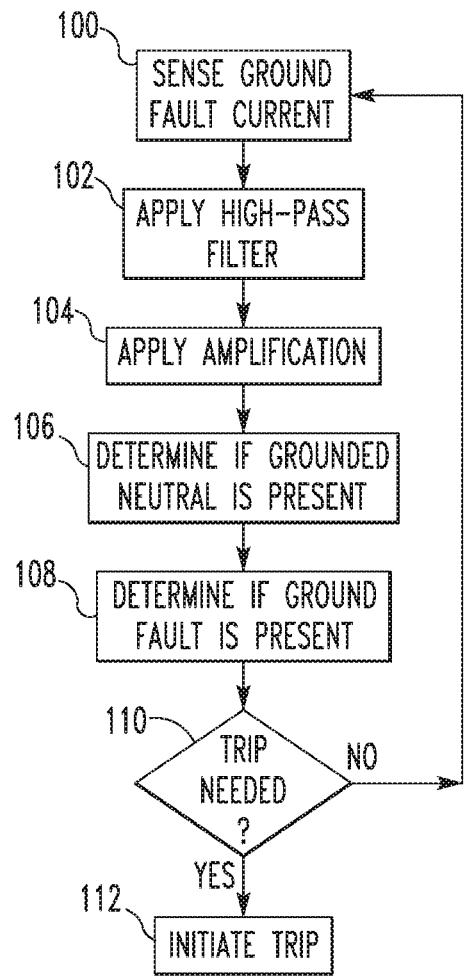
FIG. 11 is a flowchart of a method of detecting a grounded neutral in accordance with an example embodiment of the disclosed concept.

FIG. 11 is a flowchart of a method of detecting a grounded neutral in accordance with an example embodiment of the disclosed concept. The method of FIG. 11 may be implemented in a circuit interrupter such as the circuit interrupter 1 shown in FIG. 1. The method begins at 100 where a ground fault current is sensed. The ground fault current is the difference in current between the LINE and NEUTRAL conductors and may be sensed by the ground fault CT 20.

At 102 a high-pass filter is applied to the ground fault current. The high-pass filter removes 60 Hz components from the ground fault current. The high-pass filter may be applied by the filtering stage 34 of the grounded neutral detection circuit 30 shown in FIG. 2, for example. At 104, amplification is applied to filtered ground fault current. The amplification may be applied by the amplification stage 36 of the grounded neutral detection circuit 30 of FIG. 2, for example. It will be appreciated that in some example embodiments of the disclosed concept, amplification may be omitted.

At 106, a determination is made whether a grounded neutral is present. The determination is made based on the filtered and amplified ground fault current. For example and without limitation, spikes present in the filtered and amplified ground fault current may indicate that a grounded neutral is present. The determination of whether a grounded neutral is present may be made, for example, by the processor 18. At 108, a determination is made whether a ground fault is present. The determination of whether a ground fault is present is made based on the ground fault current. The determination of whether a ground fault is present may be made, for example, by the processor 18.

At 110, a determination is made whether a trip is needed. For example and without limitation, a trip may not be needed initially when a grounded neutral is present, but if the grounded neutral persists for a predetermined amount of time, a trip may then be needed. For example, it may be determined that a trip is needed only when a grounded neutral is present for a predetermined number of half-cycles in order to avoid nuisance tripping. Similarly, it may be determined that a trip is only needed if a ground fault is above a predetermined level as a trip may not be needed for low-level ground faults (e.g., without limitation, <4 mA). The determination of whether a trip is needed may be made by the processor 18.

If it is determined that a trip is needed, the method proceeds to 112 where a trip is initiated. In some example embodiments of the disclosed concept, a trip is initiated by the processor 18 outputting a trip signal to the SCR 16. If it is determined that a trip is not needed, the method returns to 100 where the ground fault current is sensed again. The method of FIG. 11 may run continuously until or trip is initiated. The method of FIG. 11 may also run at predetermined intervals.

The disclosed concept can also be embodied as computer readable codes on a tangible, non-transitory computer readable recording medium. The computer readable recording medium is any data storage device that can store data which can be thereafter read by a computer. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
   a line conductor;
   a neutral conductor;
   a power supply electrically connected between the line and neutral conductors and being structured to convert alternating current power received via the line and neutral conductors to direct current power and cause a high frequency impulse in power flowing through the line and neutral conductors;
   a ground fault current transformer structured to sense a ground fault current from current flowing through the line and neutral conductors;
   a grounded neutral detection circuit including a filtering stage structured to high-pass filter the ground fault current; and
   a processor structured to receive an output of the grounded neutral detection circuit and to determine whether a grounded neutral is present based on a presence of the high frequency impulse caused by the power supply in the output of the grounded neutral detection circuit.

2. The circuit interrupter of claim 1, wherein the filtering stage is structured to substantially filter out 60 Hz components of the output of the ground fault current transformer.

3. The circuit interrupter of claim 1, wherein the filtering stage includes a first capacitor, a second capacitor, a first resistor, and a second resistor, wherein the first capacitor and the first resistor are electrically connected to a first end of the second capacitor and the second resistor is electrically connected to a second end of the second capacitor.

4. The circuit interrupter of claim 3, wherein the first and second capacitors each have a capacitance of about 0.033 µF.

5. The circuit interrupter of claim 1, wherein the grounded neutral detection circuit further includes an amplification stage structured to amplify an output of the filtering stage.

6. The circuit interrupter of claim 5, wherein the amplification stage includes a first resistor, a second resistor, and an operational amplifier arranged as an inverting amplifier.

7. The circuit interrupter of claim 5, wherein the amplification stage has a gain of at least 30.

8. The circuit interrupter of claim 1, wherein the processor is further structured to receive the ground fault current and to determine whether a ground fault is present based on the ground fault current.

9. The circuit interrupter of claim 8, wherein the processor is structured to determining whether to initiate a trip based on at least one of the grounded neutral persisting for a predetermined amount of time or a magnitude of the ground fault and to output a signal to initiate the trip.

10. The circuit interrupter of claim 1, further comprising:
separable contacts;
an operating mechanism structured to open the separable contacts; and
a trip circuit structured to cause the operating mechanism to open the separable contacts,
wherein the processor is structured to control the trip circuit to cause the operating mechanism to open the separable contacts in response to determining that the grounded neutral is present.

11. The circuit interrupter of claim 10, wherein the trip circuit includes a trip coil and a silicon controlled rectifier electrically connected in series between the line and neutral conductors.

12. A method of detecting a grounded neutral condition with a circuit interrupter including a power supply electrically connected between line and neutral conductors and being structured to convert alternating current power received via the line and neutral conductors to direct current power and cause a high frequency impulse in power flowing through the line and neutral conductors, the method comprising:

sensing a ground fault current from current flowing through the line and neutral conductors;
applying a high-pass filter to the ground fault current; and
determining if a grounded neutral is present based on a presence of the high frequency impulse caused by the power supply in the filtered ground fault current.

13. The method of claim 12, the high-pass filter is structured to substantially filter out 60 Hz components of the ground fault current.

14. The method of claim 12, further comprising:
applying amplification to the filtered ground fault current, and
wherein determining if a ground fault is present based on the filtered ground fault current comprises determining if a grounded neutral is present based on the amplified filtered ground fault current.

15. The method of claim 14, wherein the amplification has a gain of at least 30.

16. The method of claim 12, further comprising:
determining if a ground fault is present based on the ground fault current.

17. The method of claim 16, further comprising:
determining whether to initiate a trip based on at least one of the grounded neutral persisting for a predetermined amount of time or a magnitude of the ground fault; and
if it is determined to initiate a trip, outputting a trip signal to initiate a trip of the circuit interrupter.

\* \* \* \* \*